United States Patent
Kinkade

(10) Patent No.: US 11,768,581 B1
(45) Date of Patent: Sep. 26, 2023

(54) SYSTEMS AND METHODS FOR MULTI-MODALITY INTERACTIONS IN A SPATIAL COMPUTING ENVIRONMENT

(71) Applicant: Illuscio, Inc., Culver City, CA (US)

(72) Inventor: Kyle Kinkade, Mountlake Terrace, WA (US)

(73) Assignee: Illuscio, Inc., Culver City, CA (US)

( * ) Notice: Subject to any disclaimer, the term of this patent is extended or adjusted under 35 U.S.C. 154(b) by 0 days.

(21) Appl. No.: 18/065,059

(22) Filed: Dec. 13, 2022

(51) Int. Cl.
- *G06F 3/0487* (2013.01)
- *G06F 3/0488* (2022.01)
- *G06F 3/16* (2006.01)
- *G06F 3/04815* (2022.01)
- *G06T 19/00* (2011.01)

(52) U.S. Cl.
CPC ........ *G06F 3/04815* (2013.01); *G06F 3/0487* (2013.01); *G06T 19/003* (2013.01)

(58) Field of Classification Search
CPC .. G06F 3/04815; G06F 3/0487; G06T 19/003
See application file for complete search history.

(56) References Cited

U.S. PATENT DOCUMENTS

| | | | | |
|---|---|---|---|---|
| 10,146,333 B1 * | 12/2018 | Smith | ...... | G06F 3/017 |
| 11,017,611 B1 * | 5/2021 | Mount | ...... | G06V 20/20 |
| 2008/0062126 A1 * | 3/2008 | Algreatly | ...... | G06F 3/0219 |
| | | | | 345/157 |
| 2021/0271370 A1 * | 9/2021 | Williams | ...... | G06F 3/167 |
| 2021/0304509 A1 * | 9/2021 | Berkebile | ...... | G02B 27/0093 |
| 2022/0317776 A1 * | 10/2022 | Sundstrom | ...... | G06F 3/013 |

* cited by examiner

*Primary Examiner* — Cesar B Paula
*Assistant Examiner* — Zelalem Shalu
(74) *Attorney, Agent, or Firm* — Ansari Katiraei LLP; Arman Katiraei; Sadiq Ansari

(57) ABSTRACT

Disclosed is a spatial computing system and associated methods that provide multi-modality interactions for precise and imprecise interactions with two-dimensional ("2D") and three-dimensional ("3D") user interfaces ("UI") that are presented in a 3D interactive space. The multi-modality interactions are provided by a dynamic spatial pointer. The dynamic spatial pointer has a first 3D representation for navigating the 3D interactive space and selecting one of the presented UI elements. The dynamic spatial pointer converts from the first 3D representation to a different second 3D representation in response to attaching to one of the 3D UI elements, and converts to a first 2D representation in response to attaching to one of the 2D UI elements. The second 3D representation remains attached to and tracks the 3D form of the 3D UI element, and the first 2D representation remains attached to and tracks the 2D plane of the 2D UI element.

20 Claims, 9 Drawing Sheets

SYSTEMS AND METHODS FOR MULTI-MODALITY INTERACTIONS IN A SPATIAL COMPUTING ENVIRONMENT

BACKGROUND

Two-dimensional ("2D") pointers are used within a 2D space to interact with 2D digital objects, icons, windows, and/or user interface ("UI") elements within the 2D space. Although 2D pointers can be and have been adapted for three-dimensional ("3D") environments, the 2D controls associated with the 2D pointers prevent many interactions with objects, icons, windows, and/or other UI elements that are defined about three dimensions, have a 3D form, and are distributed and selectable within a 3D space. Specifically, the interactions that are possible with the 2D controls are limited and imprecise. For instance, it is extremely difficult to accurately follow the curvature of a 3D object using a 2D pointer that moves or provides inputs only about two dimensions. To do so, requires constant rotation and movement of the 3D object or zooming in and out of the 2D pointer.

3D control pads, spatial hand tracking, and/or other 3D controllers have been developed for more accurate pointer movement in a 3D space and for controlling a 3D pointer. While these controllers add a third dimension or axis of movement and improve upon the 2D interactions supported by 2D pointers, the 3D pointers controlled by these 3D controllers still provide imprecise interactions with and control over the 3D UI elements. In fact, a 3D pointer controlled by a 3D controller may make the interactions with 3D UI elements more difficult by requiring the user to move the 3D pointer accurately across three dimensions and continually adjust the inputs about x, y, and z coordinate planes instead of just two dimensions when editing, tracing, or otherwise following the curvature or 3D shape of a 3D UI element.

DETAILED DESCRIPTION OF PREFERRED EMBODIMENTS

Figure 1:
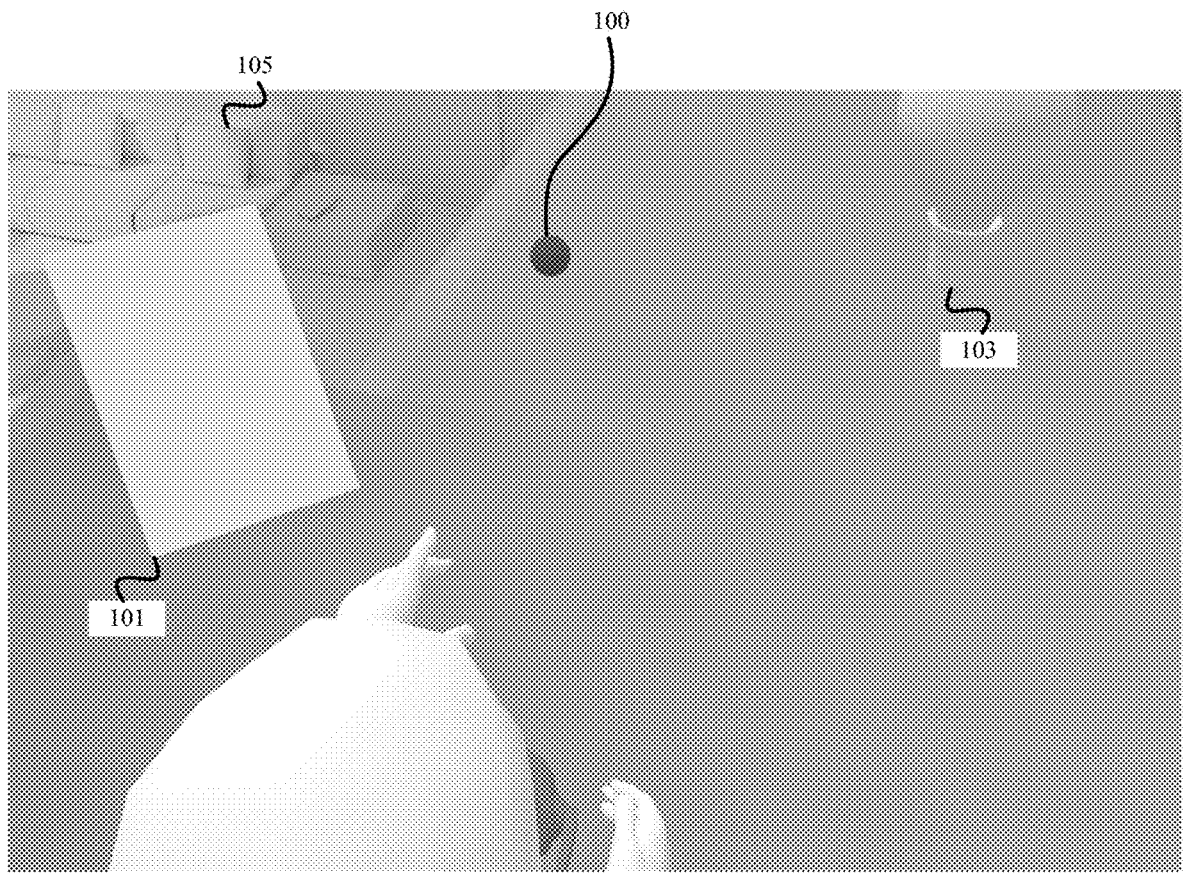
FIG. 1 illustrates an example of a dynamic spatial pointer for a spatial computing environment in accordance with some embodiment presented herein.

The following detailed description refers to the accompanying drawings. The same reference numbers in different drawings may identify the same or similar elements.

Provided are systems and methods for multi-modality interactions in a spatial computing environment. The multi-modality interactions are implemented by a dynamic spatial pointer. The dynamic spatial pointer automatically changes its form and operation to provide precise control and interaction with two-dimensional ("2D") and three-dimensional ("3D") objects, icons, windows, and/or other user interface ("UI") elements that may be distributed in the same 3D space or environment.

In some embodiments, the dynamic spatial pointer has a first representation for differentiating and identifying the dynamic spatial pointer as it moves across three dimensions of an interactive space. The first representation also provides a sufficiently large volume for simplifying the selection between different 2D and 3D UI elements distributed within that interactive space.

In some such embodiments, the first representation of the dynamic spatial pointer is a sphere, cube, or other 3D form that is readily differentiable amongst the distributed UI elements in the interactive space and the interactive space background or empty space. Specifically, the dynamic spatial pointer takes or has the first representation when the selection of individual pixels or the precise movement between pixels is not required, and when a larger form or shape assists in tracking user movements in a 3D space and in selecting larger UI elements that are distributed at different positions and/or depths within that 3D space.

In response to using the dynamic spatial pointer with the first representation to select a 2D UI element in the interactive space, the dynamic spatial pointer automatically attaches to that 2D UI element and/or changes from the first representation to a second representation. The second representation changes from 3D pointer to a 2D pointer.

The second representation includes one or more of a 2D dot or flattened 2D pointer for moving within and selecting large subelements within the 2D plane of the 2D UI element, or a 2D ballpoint or precise 2D selection pointer for precise selection and control of individual pixels or data points within the 2D plane of the 2D UI element. Accordingly, the second representation provides a 2D shape or form that simplifies movements and/or interactions with a 2D UI element relative to the 3D shape or form provided by the first representation of the dynamic spatial pointer. In some embodiments, the second representation is automatically selected for the dynamic spatial pointer in response to detecting the dynamic spatial pointer nearing, attaching to, or entering within the boundaries of the 2D UI element.

Once attached to the 2D UI element, the dynamic spatial pointer tracks and/or maps 2D to 3D inputs to the 2D plane of the 2D UI element. In other words, the user input is translated to the coordinate space of that 2D plane so that the second representation of the dynamic spatial pointer is connected to and moves over the pixels of the 2D UI element even when the x, y, or z coordinates of the user input differs from the coordinates of the 2D UI element and would otherwise cause the dynamic spatial pointer to move off or through the coordinate space or plane of the 2D UI element.

In response to using the dynamic spatial pointer with the first representation to select a 2D UI element in the interactive space, the dynamic spatial pointer automatically attaches to that 3D UI element and/or changes from the first representation to a third representation for precise control and interaction within the 3D shape of the 3D UI element. In some embodiments, the third representation includes a 3D teardrop or other 3D pointer with an edge that moves and/or rotates about three dimensions to precisely select pixels at any orientation or position about a 3D surface or 3D object.

The dynamic spatial pointer attaches to and tracks the curvature and/or 3D form of the 3D UI element. In particular, the dynamic spatial pointer translates user inputs to the 3D coordinate space of the 3D UI element so that the dynamic spatial pointer remains connected to pixels representing the 3D UI element even when x, y, or z coordinates of the user inputs do not track directly to the x, y, or z coordinates of the 3D UI element. The user input translation may involve converting 2D inputs from a 2D controller (e.g., a mouse) to the 3D coordinate space of the 3D UI element (e.g., translating x and y inputs to x, y, and z coordinates of the 3D UI element), or mapping 3D inputs from a 3D controller to the 3D coordinate space of the 3D UI element even when x, y, or z coordinates of the user input deviate slightly from the x, y, or z coordinates of the 3D UI element (e.g., move off of or through the surface of the 3D UI element). In this manner, the attachment of the dynamic spatial pointer to the 3D UI element and the third representation of the dynamic spatial pointer enable the precise selection of and movement across individual pixels or data points about the 3D surface of the 3D UI element without the user inputs having to exactly match the curvature, shape, and/or positioning of the pixels or data points forming the 3D UI element.

In some embodiments, the dynamic spatial pointer detaches from any attached UI element via a specialized gesture, key command, or other user input. In some other embodiments, the dynamic spatial pointer detaches from an attached UI element in response to user input that deviates from the coordinate space of that UI element by a threshold amount. Detaching the dynamic spatial pointer involves changing the shape of the dynamic spatial pointer back to the first representation for easier movement in the spatial computing environment and easier selection and/or interaction with the UI elements distributed within the interactive space of the spatial computing environment.

FIG. 1 illustrates an example of dynamic spatial pointer 100 for a spatial computing environment in accordance with some embodiment presented herein. The spatial computing environment includes a digital interactive space with a mix of 2D UI elements 101, 3D UI elements 103, and/or real-world elements 105.

In some embodiments, the spatial computing environment is purely a digitally created environment for navigating between 2D UI elements 101 and/or 3D UI elements 103. 2D UI elements 101 and 3D UI elements 103 include digitally created objects, icons, windows, files, directories, applications, tools, and/or other interactive or selectable components of a computer system. In some such embodiments, the spatial computing environment corresponds to an operating system, a virtual reality ("VR") environment, a file system, a metaverse environment, and/or other digital world or environment for one or more users.

In some embodiments, the spatial computing environment represents an augmented reality and/or mixed reality ("AR/MR") environment that presents real-world elements 105 with digitally created 2D UI elements 101 and/or 3D UI elements 103. Real-world elements 105 correspond to physical objects that are captured by one or more cameras or sensors of the AR/MR headset or device.

2D UI elements 101 are defined and represented in two dimensions. Specifically, 2D UI elements 101 include pixels or data points that are distributed about a single plane in which one of the x, y, or z coordinates is fixed. For instance, application windows or files are typically represented as 2D UI elements 101 in the spatial computing environment.

3D UI elements 103 are defined and represented in three dimensions. 3D UI elements 103 include pixels or data points that are distributed about multiple planes or dimensions, and are defined with x, y, and z coordinates that are varied across all three dimensions. 3D UI element 103 include volumetric objects, curved surfaces, and/or other elements that may be interacted with across three dimensions.

Real-world elements 105 include 2D planes or 3D bounding boxes or borders that are generated for and/or placed on the physical object appearing in the captured images. For instance, the spatial computing environment performs plane detection and/or other object recognition within the images captured by a camera or another sensor. The plane detection and/or other object recognition define digital constructs (e.g., real-world elements 105) for selecting and interacting with the physical objects in the interactive space. For instance, the plane detection may create a digital tabletop over an image of an actual tabletop presented within an AR/MR visualization of the spatial computing environment so that the color, texture, and/or other characteristics of the digital tabletop may be changed in the AR/MR visualization to demonstrate how those changes would appear on the actual tabletop without having to physically change the actual tabletop in the real world.

Each 2D UI element 101, 3D UI element 103, and real-world element 105 is selectable using dynamic spatial pointer 100, and may be interacted with using dynamic spatial pointer 100. In some embodiments, each 2D UI element 101 and 3D UI element 103 is defined in a separate file or data structure, and is loaded into the spatial computing environment. In some other embodiments, each 2D UI element 101 and 3D UI element 103 is defined as part of the collective spatial computing environment. For instance, the spatial computing environment is represented as a single point cloud with different sets of data points within the point cloud corresponding to different 2D UI elements 101 or 3D UI elements 103.

In any case, the spatial computing environment differentiates each 2D UI element 101, 3D UI element 103, and real-world element 105. For instance, the pixels or data points representing each element 101, 103, or 105 may be tagged with an identifier that identifies which element 101, 103, or 105 those pixels or data points belong to or what element 101, 103, or 105 those pixels or data points represent. The element differentiation may be performed and tracked when loading in separate files or data structures for each element 101, 103, or 105, or by analyzing the shapes, forms, representations, or code for individual elements 101, 103, or 105. Accordingly, each element 101, 103, or 105 within the spatial computing environment is defined with boundaries or a set of coordinates for the pixels, data points, or other constructs that form and represent that element 101, 103, or 105 in the spatial computing environment.

As shown in FIG. 1, dynamic spatial pointer 100 is presented with a first form or representation for easy identification and movement within the spatial computing environment, and/or for the imprecise selection and/or attachment to the different elements 101, 103, or 105 within the spatial computing environment. Dynamic spatial pointer 100 is controlled by a controller.

The controller is an input device. A mouse, trackpad, touchscreen, and keyboard are examples of a controller that provide 2D inputs or inputs that are defined with x and y coordinates. A hand or gesture tracking device, controllers for a VR, AR, or MR device, and positional tracking controllers are examples of a controller that provide 3D inputs or inputs that are defined with x, y, and z coordinates.

The first form or representation of dynamic spatial pointer 100 corresponds to a volumetric shape, such as a sphere, that is easily moved in 3D space, that is easily visible in the 3D space, and that spans a region of the 3D space to allow for simple selection of any of UI elements 101, 103, or 105. Specifically, the volumetric shape spans multiple pixels or data points across three dimensions to provide a larger surface area or volume than a crosshair pointer or other pointer that selects individual pixels or data points at an edge. The larger surface area or volume simplifies UI element selection by making the intersection or selection of UI elements 101, 103, and 105 easier to visually identify.

In some embodiments, dynamic spatial pointer 100 retains its shape but changes coloring or other visual characteristics to indicate when a particular UI element may be selected using dynamic spatial pointer 100. For instance, dynamic spatial pointer 100 changes from a first color to a second color when it is a threshold distance from a particular UI element. The color change occurs in response to the spatial computing environment tracking the 3D position of dynamic spatial pointer 100 and comparing the 3D position to the coordinates of various UI elements 101, 103, or 105 distributed in the spatial computing environment. After dynamic spatial pointer 100 changes to the second color, a user may provide a particular input that causes dynamic spatial pointer 100 to attach to that particular UI element.

In some embodiments, a border color or other visual characteristic of the particular UI element changes to the same color as dynamic spatial pointer 100 to identify which UI element spatial dynamic pointer 100 will attach to. For instance, dynamic spatial pointer 100 may be positioned within a threshold distance of a first UI element and a second UI element, and closer to or intersecting more of the second UI element. In this instance, dynamic spatial pointer 100 and the border of the second UI element change to a matching color to alert the user that dynamic spatial pointer 100 is configured to attach to the second UI element and not the first UI element. If the user desires to attach to the first UI element, the user may reposition dynamic spatial pointer 100 using the controller until dynamic spatial pointer 100 and the border of the first UI element are the same color.

Figure 2:
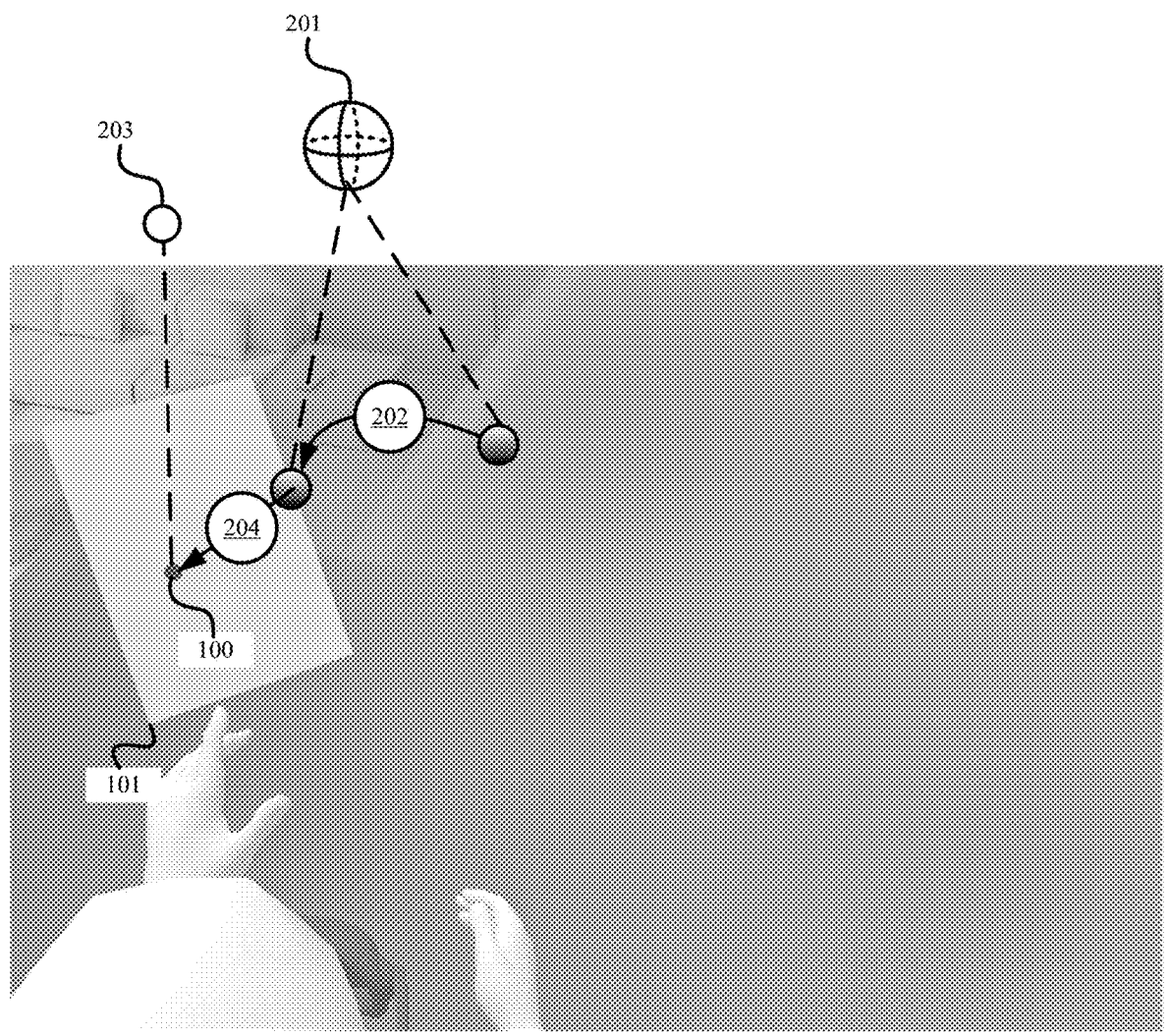
FIG. 2 illustrates attachment of the dynamic spatial pointer to a two-dimensional ("2D") user interface ("UI") element in accordance with some embodiments presented herein.

FIG. 2 illustrates attachment of dynamic spatial pointer 100 to 2D UI element 101 in accordance with some embodiments presented herein. As shown in FIG. 2, dynamic spatial pointer 100 having the first representation for UI element selection is moved (at 202) within the spatial computing environment until it is within a threshold distance of or intersects part of 2D UI element 101. In this example, 2D UI element 101 is a window for accessing, opening, or interacting with an application.

In some embodiments, dynamic spatial pointer 100 automatically attaches (at 204) to 2D UI element 101 upon entering within the threshold distance of or intersecting part of 2D UI element 101. In some other embodiments, dynamic spatial pointer 100 attaches (at 204) to 2D UI element 101 in response to entering within the threshold distance of or intersecting part of 2D UI element 101 and receiving user input to trigger the attachment.

Attaching (at 204) dynamic spatial pointer 100 to 2D UI element 101 includes changing the form or representation of dynamic spatial pointer 100 from first volumetric shape 201 to a second flattened 2D shape 203 or representation that is parallel to the plane of 2D UI element 101. For instance, changing dynamic spatial pointer 100 includes flattening the spherical pointer to a 2D circular pointer.

In some embodiments, the spatial computing environment tracks the plane or 2D coordinates of 2D UI element 101. For instance, the spatial computing environment tracks the x and y coordinates for each boundary or corner of 2D UI element 101, and the static z coordinate at which 2D UI element 101 is positioned within the spatial computing environment.

Attaching (at 204) dynamic spatial pointer 100 to 2D UI element 101 further includes retaining the second representation of dynamic spatial pointer 100 within the boundaries of 2D UI element 101 while dynamic spatial pointer 100 is attached to 2D UI element 101. Moreover, the spatial computing environment locks one dimension of the controller input so that dynamic spatial pointer 100 is not inadvertently lifted off or away from 2D UI element 101 while attached (at 204) to 2D UI element 101. For instance, 2D UI element 101 may have a flat rectangular shape that spans a first set of x and y coordinates with a static z-coordinate. In this example, attaching (at 204) dynamic spatial pointer 100 includes setting or fixing the z-coordinate value for the flattened 2D pointer to the static z-coordinate value of 2D UI element 101, and ignoring controller inputs that deviate from that static z-coordinate value by less than a threshold amount. In other words, the spatial computing environment maps or converts that z-coordinate value provided by the input controller to the static z-coordinate value of 2D UI element 101 in order to prevent dynamic spatial pointer 100 from lifting off or penetrating through the 2D plane of 2D UI element 101 inadvertently or by a few pixels or data points when the z-coordinate inputs deviate from the static z-coordinate value of 2D UI element 101 by less than a threshold amount.

The flattened 2D pointer has a shape that allows for simple navigation within the 2D plane of 2D UI element 101, and for the selection of 2D subelements within 2D UI element 101 that have a sufficiently large area where precise selection is not required. The 2D subelements include 2D button, menus, icons, and other 2D controls within the window or plane of 2D UI element 101. In other words, the 3D spherical pointer corresponding to the first representation of dynamic spatial pointer 100 becomes detrimental and more difficult to control and make selections when working with elements in a 2D plane. Accordingly, dynamic spatial pointer 100 changes form to the flattened 2D pointer to provide a 2D pointer for selecting and interacting with 2D subelements within 2D UI element 101.

Figure 3:
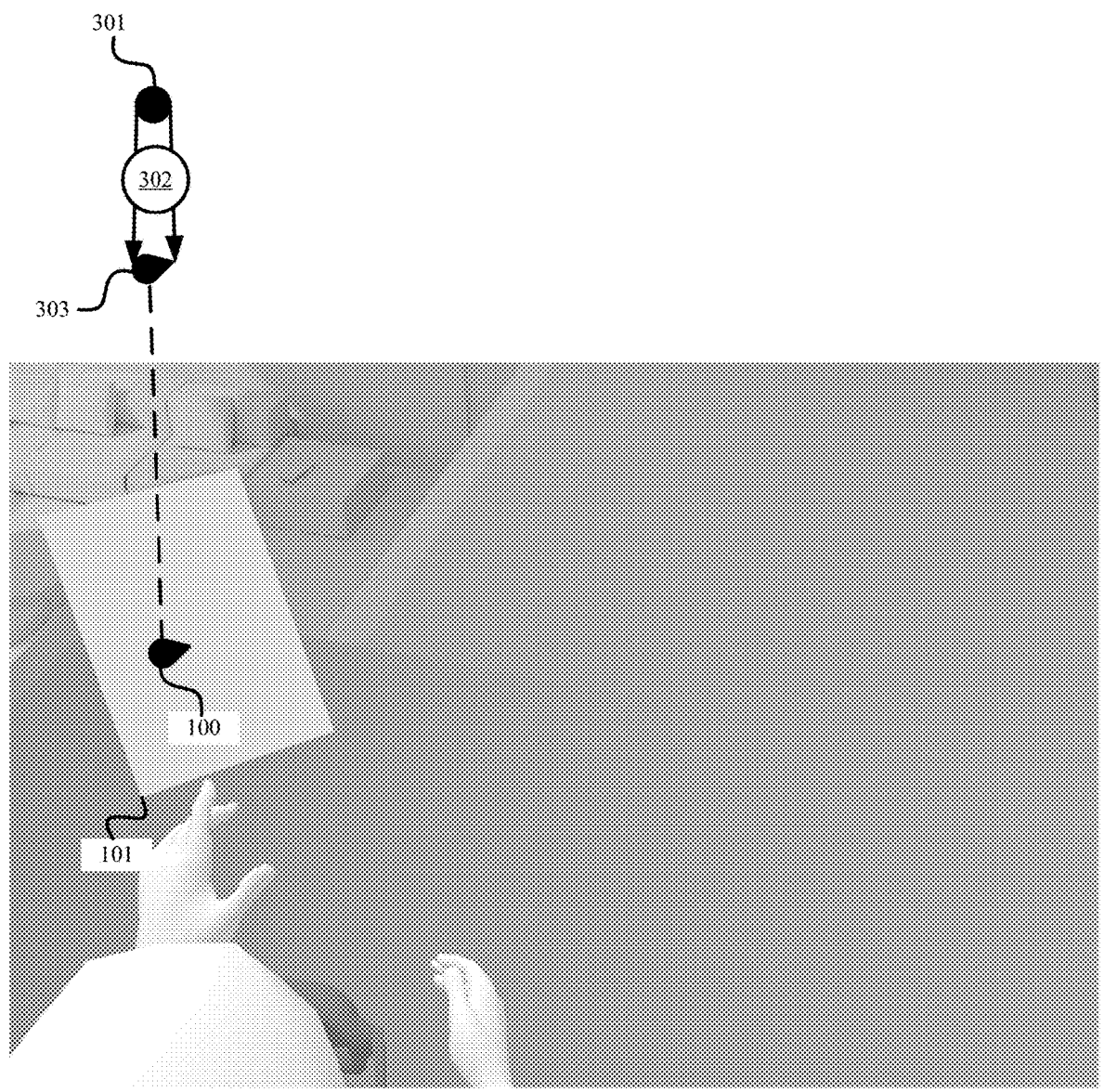
FIG. 3 illustrates adapting the dynamic spatial pointer for precise interaction within the attached 2D UI element in accordance with some embodiments presented herein.

FIG. 3 illustrates adapting dynamic spatial pointer 100 for precise interaction within 2D UI element 101 in accordance with some embodiments presented herein. Flattened 2D pointer 301 does not provide precise control or interaction within 2D UI element 101. For instance, flattened 2D pointer 301 covers or spans multiple pixels or data points of 2D UI element 101. Accordingly, flattened 2D pointer 301 cannot be used to accurately select or edit an individual pixel, data point, line, or region of 2D UI element 101 that is smaller than the diameter of flattened 2D pointer 301.

The spatial computing environment converts (at 302) dynamic spatial pointer 100 from the second representation of flattened 2D pointer 301 to a third form 303 or representation for the precise selection and interaction of or within 2D UI element 101. In some embodiments, dynamic spatial pointer 100 changes from flattened second 2D representation 301 to third representation 303 for precise selection and interaction of or within 2D UI element 101 in response to user input for activating functionality for the precise selection and interaction. For instance, a specific gesture, command, or other user input from the controller may be used to transition dynamic spatial pointer 100 from flattened 2D pointer 301 to an attached precise 2D selection pointer.

The precise 2D selection pointer is representative of the third form 303 or representation for dynamic spatial pointer 100. Third form 303 or the precise 2D selection pointer has a flattened conical shape with a selection tip. The selection tip corresponds to the point at which pixels or data points are selected from 2D UI element 101 when dynamic spatial pointer 100 is activated to perform a fine or granular selection, edit, or other interaction. Accordingly, third representation 303 of dynamic spatial pointer 100 directly points to the pixels or data points of a 2D plane or 2D UI element 101 that may be selected or interacted with rather than flattened 2D pointer 301 that covers or overlaps the selectable pixels or data points.

The precise 2D selection pointer is used to cut, select, edit, and/or otherwise interact with specific or individual pixels or data points within 2D UI element 101. The precise 2D selection pointer is attached to 2D UI element 101, and maps controller inputs to the coordinates or boundaries of 2D UI element 101. For instance, dynamic spatial pointer 100 may discard inputs of the controller for a third axis when the precise 2D selection pointer is active and attached to 2D UI element 101. In some embodiments, dynamic spatial pointer 100 automatically tracks and modifies the third axis positioning of the precise 2D selection pointer based on the coordinates of 2D UI element 101 and the controller inputs provided for the other two axes. For instance, 2D UI element 101 may be oriented at an angle in 3D space such that the z-coordinate position of 2D UI element 101 changes from the top to the bottom of 2D UI element 101. In this scenario, dynamic spatial pointer 100 maps the changing z-coordinate position of 2D UI element 101, and automatically adjusts the z-coordinate position of the precise 2D selection pointer to match the z-coordinate position of 2D UI element 101 for the x and y coordinate position of the precise 2D selection pointer within 2D UI element 101. In doing so, the selection tip of dynamic selection pointer 100 with third representation 303 may be used to precisely select a region or set of pixels within the 2D plane of 2D UI element 101 without concern that inputs provided by the controller will inadvertently lift dynamic spatial pointer 100 off or poke through the 2D plane of 2D UI element 101. In other words, the user can focus on moving the selection tip of dynamic selection pointer 100 over the desired pixels or data points of 2D UI element 101 across two dimensions despite 2D UI element 101 being suspended and/or interacted with in 3D space.

In some embodiments, dynamic spatial pointer 100 automatically changes from the attached 2D flattened pointer to the attached precise 2D selection pointer. In some such embodiments, dynamic spatial pointer 100 analyzes 2D UI element 101 to map the positioning of its subelements and/or determine the functionality associated with the subelements. If a subelement requires precise control, selection, and/or interaction, then dynamic spatial pointer 100 automatically changes to the attached precise 2D selection pointer when nearing that subelement. For instance, if a subelement of 2D UI element 101 is a dropdown menu or a button, then dynamic spatial pointer 100 is provided as the 2D flattened pointer, and if the subelement is an editing window with pixels of an image, then dynamic spatial pointer 100 is provided as the precise 2D selection pointer. In some other embodiments, dynamic spatial pointer 100 tracks tools or functionality that have been activated when dynamic spatial pointer 100 is attached to 2D UI element 101. For instance, in response to a user activation of an editing tool while 2D UI element 101 is selected or frontmost, dynamic spatial pointer 100 changes to the attached precise 2D selection pointer. In response to deactivation of the editing tool and reverting to a navigation mode, dynamic spatial pointer changes to the attached 2D flattened pointer.

Dynamic spatial pointer 100 also adapts to and provides different precise pointers for and/or interacting with 3D UI elements 103 that have curved surfaces and/or subelements distributed about a volume. The 2D flattened pointer and the precise 2D selection pointer, corresponding to the second and third representations of dynamic spatial pointer 100, do not provide the movement and control in 3D space that is needed to precisely interact with the curved surfaces and/or the subelements distributed about the volume of 3D UI elements 103. Accordingly, dynamic spatial pointer 100 changes to a fourth form or representation for precise selection and interaction with 3D UI elements 103.

Figure 4:
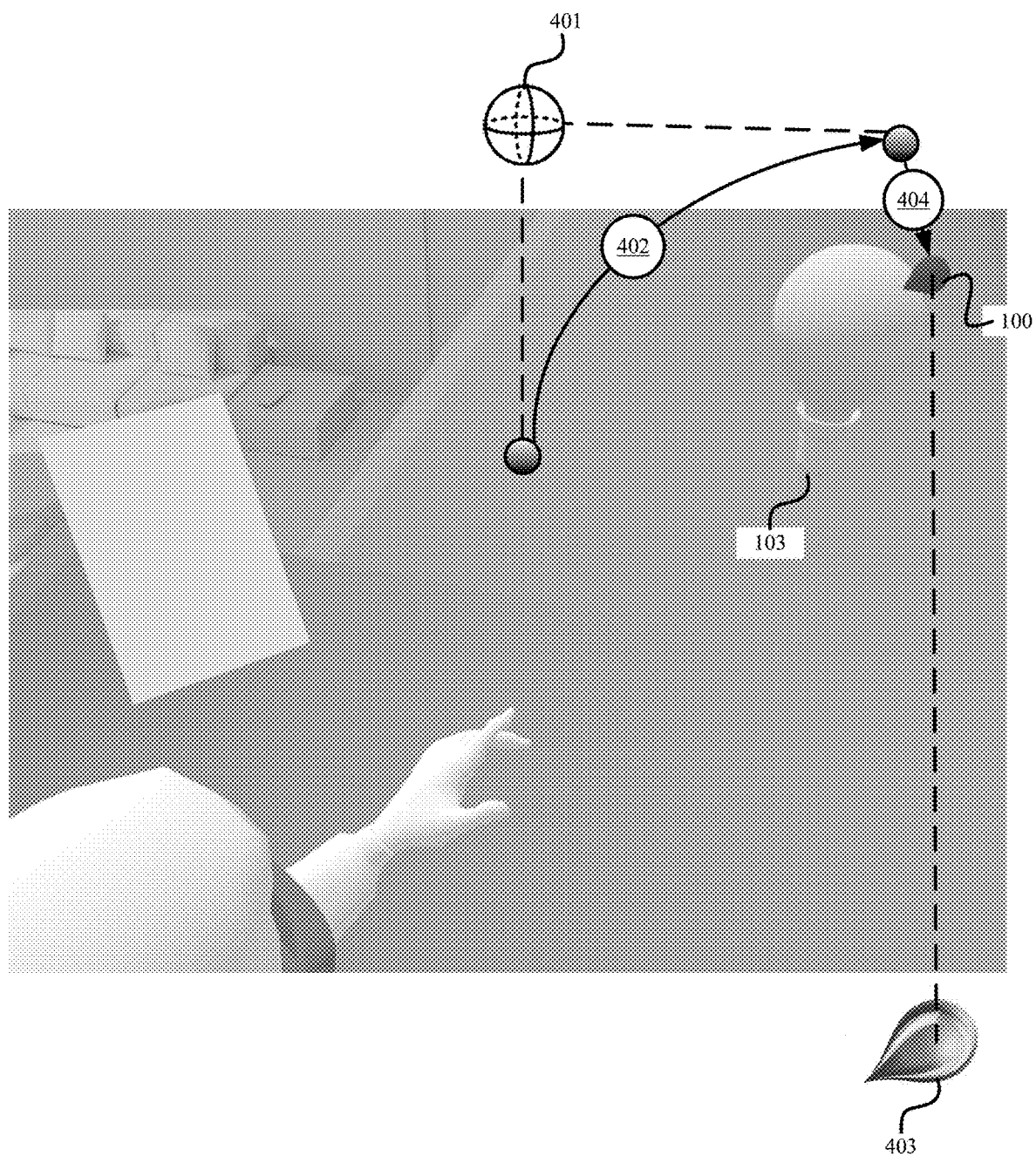
FIG. 4 illustrates an example of adapting the dynamic spatial pointer for precise interaction with a three-dimensional ("3D") UI element in accordance with some embodiments presented herein.

FIG. 4 illustrates an example of adapting dynamic spatial pointer 100 for precise interaction with 3D UI element 103 in accordance with some embodiments presented herein. Dynamic spatial pointer 100 has the first representation (e.g., spherical pointer 401) as it is moved (at 402) within the spatial computing environment until it is within a threshold distance of or intersects part of 3D UI element 103. In this example, 3D UI element 103 is a 3D object that is added to or inserted in the spatial computing environment and that provides various interactive functionality.

In some embodiments, dynamic spatial pointer 100 automatically attaches (at 404) to 3D UI element 103 upon entering within the threshold distance of or intersecting part of 3D UI element 103. In some other embodiments, dynamic spatial pointer 100 attaches (at 404) to 3D UI element 103 in response to entering within the threshold distance of or intersecting part of 3D UI element 103 and receiving user input to trigger the attachment.

Attaching (at 404) dynamic spatial pointer 100 to 3D UI element 103 includes changing the form or representation of dynamic spatial pointer 100 from the first volumetric shape (e.g., spherical pointer 401) to a second volumetric shape with a selection tip that may be oriented and/or positioned in three dimensions. For instance, changing dynamic spatial pointer 100 includes morphing spherical pointer 401 to 3D teardrop pointer 403.

Attaching (at 404) dynamic spatial pointer 100 to 3D UI element 103 further includes retaining the selection tip of 3D teardrop pointer 403 on the surface of 3D UI element 103 while dynamic spatial pointer 100 is attached to 3D UI element 103. In other words, the selection tip of 3D teardrop pointer 403 remains attached to the changing surface of 3D UI element 103 as dynamic spatial pointer 100 is moved across the 3D form of 3D UI element 103 with the larger end or volume of the cone identifying the positioning of 3D teardrop pointer 403 about 3D UI element 103. Accordingly, the point of contact between 3D teardrop pointer 403 and 3D UI element 103 is the selection tip with the other parts of 3D teardrop pointer 403 floating off or away from the surface of 3D UI element 103. The volumetric shape of 3D teardrop pointer 403 provides a better visualization of the orientation, rotation, and position of dynamic spatial pointer 100 about 3D UI element 103 that the flattened 2D pointer or other 2D pointer shape. In other words, the direction and positional depth of dynamic spatial pointer 100 about 3D UI element 103 is better represented with a volumetric and/or 3D pointer than a flattened and/or 2D pointer.

Dynamic spatial pointer 100 tracks the coordinates and/or form of 3D UI element 103. In some embodiments, the coordinates and/or form of 3D UI element 103 are defined and/or encoded in a file or data structure that represents that 3D UI element 103, and that is loaded into the spatial computing environment. Dynamic spatial pointer 100 obtains the coordinates to determine when to attach (at 404) to 3D UI element 103 and map controller inputs to the surface of 3D UI element 103. In some other embodiments, the coordinates and/or form of 3D UI element 103 are determined from analyzing the positioning of 3D UI element 103 within the spatial computing environment.

3D teardrop pointer 403 orients, rotates, and/or moves across 3D UI element 103 according to the tracked coordinates and/or form of 3D UI element 103. During the movements, the selection tip of 3D teardrop pointer 403 remains connected to and points to the pixels or data points of 3D UI element 103 that may be selected and/or interacted with using 3D teardrop pointer 403. In other words, dynamic spatial pointer 100 adapts or maps the controller inputs to keep the selection tip of the second 3D volumetric shape connected to the surface of 3D UI element 103 even when the controller inputs slightly deviate from the coordinates for the 3D UI element 103 surface. For instance, dynamic spatial pointer 100 prevents 3D teardrop pointer 403 and/or its selection tip from penetrating through the surface of 3D UI element 103 or lifting off the surface of 3D UI element 103 if one or more of the x, y, or z coordinates provided as input from the controller deviate from one or more of the x, y, or z coordinates of the 3D UI element 103 surface.

The attachment of 3D teardrop pointer 403 to the surface of 3D UI element 103 and the translation and/or mapping of the controller inputs to the surface coordinates of 3D UI element 103 simplify the user interaction with 3D UI element 103 while also adapting imprecise inputs for precise control and interaction with 3D UI element 103. Specifically, the selection tip of 3D teardrop pointer 403 is used to precisely select or interact with individual pixels or data points distributed across the volume or surface of 3D UI element 103 with controller inputs that are accurate in at least one or two of three dimensions. The surface tracking and mapping provided as a result of attaching dynamic spatial pointer 100 to 3D UI element 103 corrects and retains the selection tip on the 3D UI element 103 surface for other dimensions of the controller inputs that are inaccurate or that are not perfectly aligned with the corresponding dimensions of 3D UI element 103.

Figure 5:
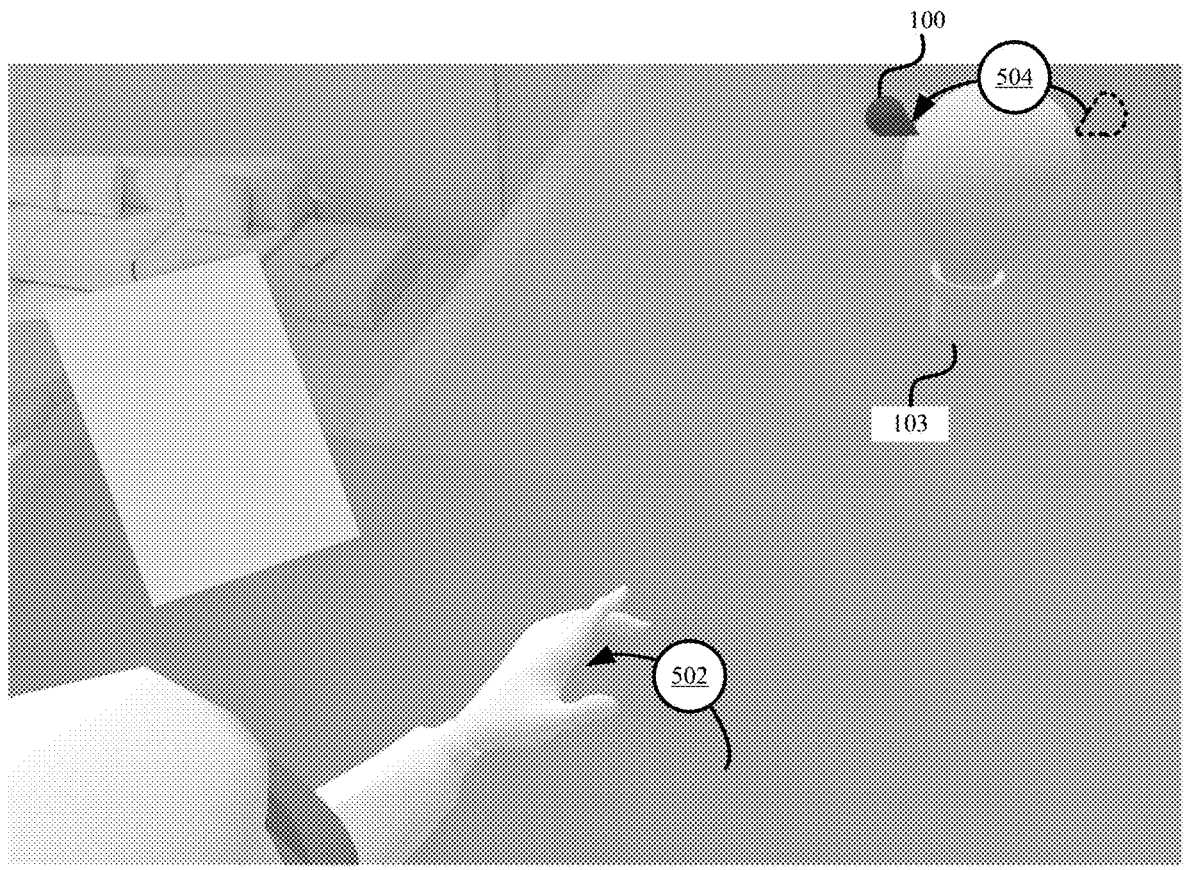
FIG. 5 illustrates the selection tip from the 3D teardrop pointer representation of dynamic spatial pointer tracking the curvature and form of an attached 3D UI element in accordance with some embodiments presented herein.

FIG. 5 illustrates the selection tip from the 3D teardrop pointer representation of dynamic spatial pointer 100 tracking the curvature and form of 3D UI element 103 based on user input that deviates from the curvature and form of 3D UI element 103 in accordance with some embodiments presented herein. The user provides (at 502) input that does not directly translate to or match the coordinates for the curvature and form of 3D UI element 103. However, since dynamic spatial pointer 100 is attached to 3D UI element 103, the deviating inputs are adjusted and/or mapped (at 504) to retain dynamic spatial pointer 100 on the surface of 3D UI element 103.

The input translation and/or mapping allows for precise selections, edits, and/or other interactions to be made on the surface of 3D UI element 103 quickly and accurately without the user painstakingly providing exact inputs that match the changing x, y, and z coordinates of each pixel or data point of 3D UI element 103. For instance, rather provide exact inputs that match the curving shape of 3D UI element 103 (e.g., differing x-coordinates and z-coordinates) or continually adjust the inputs to reposition dynamic spatial pointer 100 on the surface of 3D UI element 103, the user may provide continuous input in one direction (e.g., increasing x-coordinates with the same z-coordinate), and dynamic spatial pointer 100 may map (at 504) that input so that the selection tip remains attached to the curving shape. In this instance, input provided in a single dimension (e.g., x-coordinate) is accurately mapped to exact positions about two dimensions of 3D UI element 103 (e.g., x and z coordinates). The mapping assists in the precise selection and/or interaction with 3D UI element 103.

In some embodiments, the user performs a specific gesture and/or provides specific input that causes dynamic spatial pointer 100 to detach from 3D UI element 103 or another attached UI element, and to change from the 3D teardrop pointer representation back to the first representation for the spherical pointer used in navigating the spatial computing environment and selecting different UI elements to interact with next. In some other embodiments, dynamic spatial pointer 100 detaches from 3D UI element 103 or another attached UI element in response to user input that deviates by more than a threshold amount from the coordinates or boundaries of the attached UI element.

Figure 6:
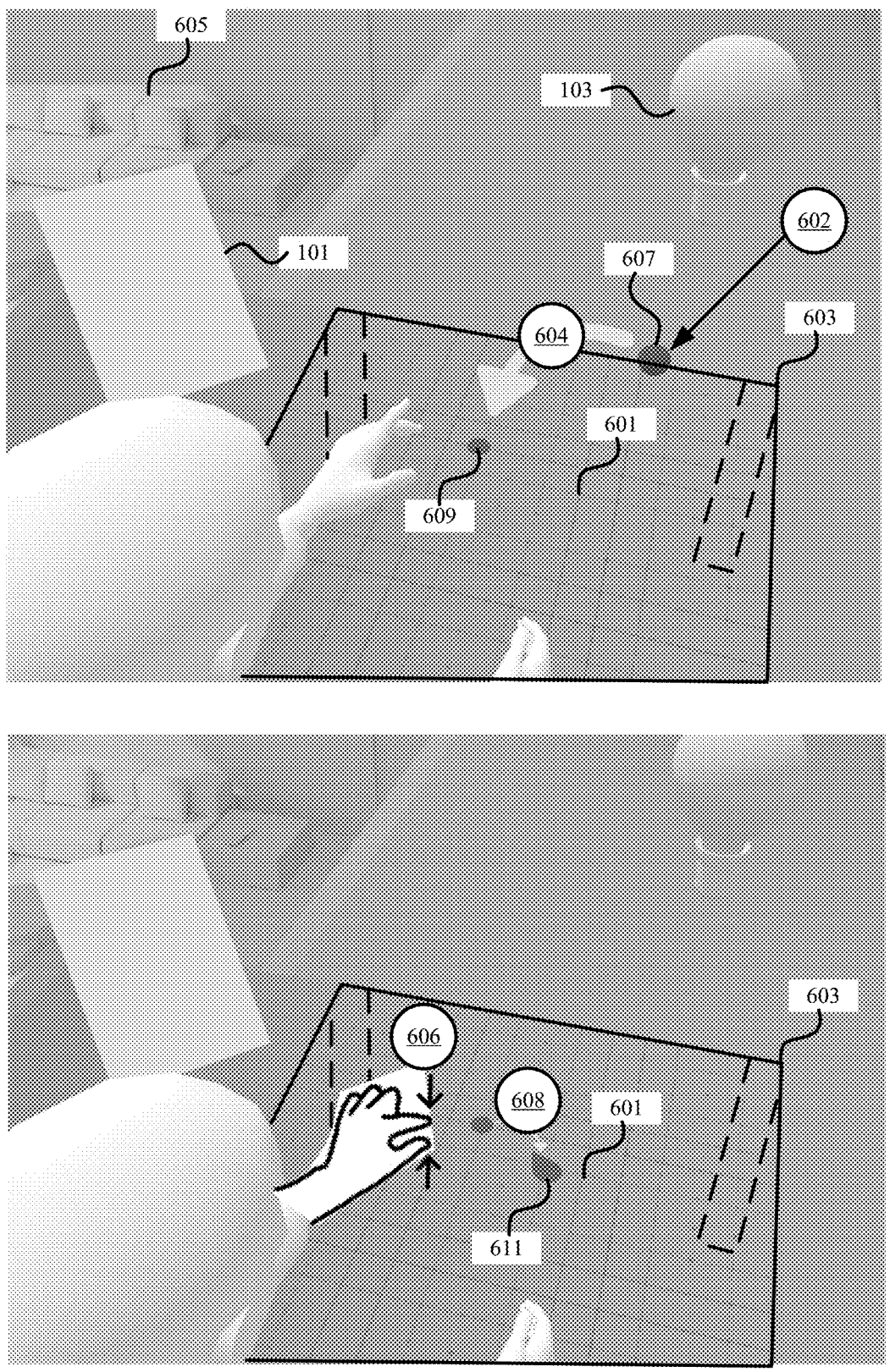
FIG. 6 illustrates an example of using the dynamic spatial pointer to interact with a real-world element in a spatial computing environment in accordance with some embodiments presented herein.

FIG. 6 illustrates an example of using dynamic spatial pointer 100 to interact with real-world element 601 in a spatial computing environment in accordance with some embodiments presented herein. The spatial computing environment is analyzed to detect physical objects that are presented or included therein. For instance, the spatial computing environment includes a table or desk 603 and couch 605 as physical objects that are intermixed with 2D UI element 101 and 3D UI element 103.

Physical objects 603 and 605 are further analyzed to define real-world elements (e.g., real-world element 601) for interacting with physical objects 603 and 605 in the spatial computing environment. Defining the real-world elements includes performing plane, image, or object detection to identify 2D planes or outlines for physical objects 603 and 605, and creating an interactive overlay in the shape of the identified 2D planes or outlines that is connected or moves with the identified 2D planes or outlines. For instance, real-world element 601 includes an interactive plane that is placed atop the image of table or desk 603, and that may be interacted with using dynamic spatial pointer 100 to change the appearance and/or perform other edits to physical object 603 in the spatial computing environment.

To interact with real-world element 601, the user provides input that moves (at 602) spherical pointer 607 towards real-world element 601. Once spherical pointer 607 is a threshold distance from real-world element 601, makes contact with real-world element 601, or is provided attaching input, spherical pointer 607 is changed (at 604) to flattened 2D pointer 609 based on the 2D plane that is defined for real-world element 601, and flattened 2D pointer 609 is attached to real-world element 601.

Flattened 2D pointer 609 is used to move across the 2D plane of real-world element 601 and/or to perform imprecise interactions with large subelements (e.g., buttons, icon, menus, and subelement that span a region of multiple pixels or data points) of real-world element 601. However, the shape and form of flattened 2D pointer 609 as well as its size spanning multiple pixels or data points renders flattened 2D pointer 609 ineffective for selecting and/or interacting with individual pixels or data points of real-world element 601. Accordingly, the user provides (at 606) input for switching from flattened 2D pointer 609 to precise 2D selection pointer 611. In response to the provided (at 606) input, dynamic spatial pointer 100 changes (at 608) to precise 2D selection pointer 611 which may be used to select and/or interact with specific pixels or data points of real-world element 601. For instance, precise 2D selection pointer 611 may be used to edit a region of real-world element 601 in order to visualize how table or desk 603 would appear with those edits.

Figure 7:
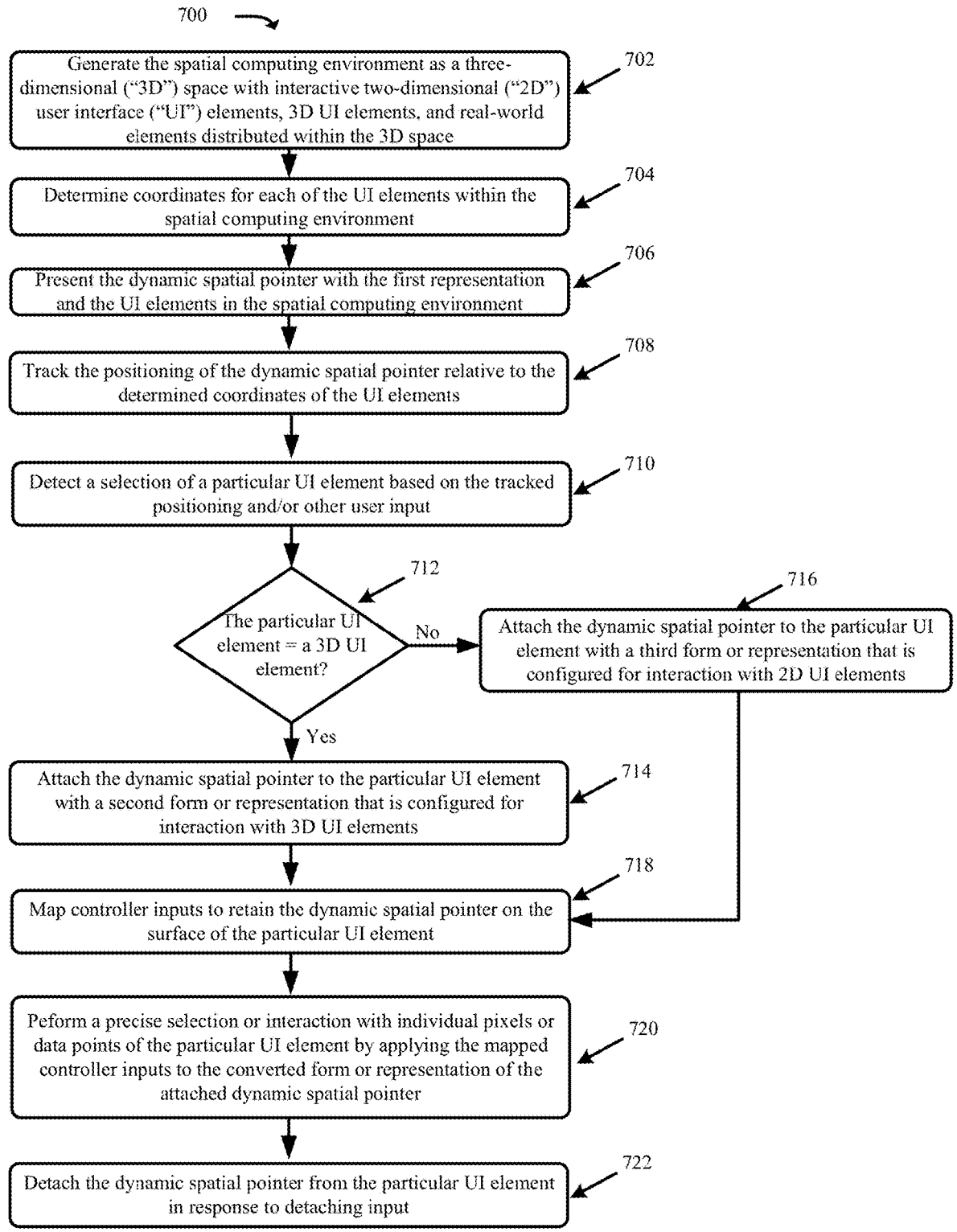
FIG. 7 presents a process for operation of the dynamic spatial pointer in a spatial computing environment in accordance with some embodiments presented herein.

FIG. 7 presents a process 700 for operation of dynamic spatial pointer 100 in a spatial computing environment in accordance with some embodiments presented herein. Process 700 is implemented by a device and/or software that create and run the spatial computing environment. The device includes one or more processors, memory, storage, network, and/or other hardware resources. In some embodiments, the device is a VR, MR, AR, and/or other spatial computing device. In some other embodiments, the device is a computing system that generates the spatial computing environment in a 2D display.

Process 700 includes generating (at 702) the spatial computing environment as a 3D space with interactive 2D UI elements, 3D UI elements, and real-world elements distributed within the 3D space. Generating (at 702) the spatial computing environment includes rendering a VR, AR, MR, and/or other 3D environment. In some embodiments, the 3D environment represented by the spatial computing environment corresponds to a 3D interactive operating system, a metaverse, and/or other environment with which to interact with the UI elements in a 3D space.

In some embodiments, generating (at 702) the spatial computing environment includes loading in files or data structures that encode the different UI elements that are presented in the space. The distribution and/or positioning of the UI elements within the 3D space may be defined for each UI element in each of the files or data structures containing the UI element data, may be defined by the spatial computing environment as the UI elements are loaded in, or may be dynamically determined based on which UI elements are included in the spatial computing environment.

Generating (at 702) the spatial computing environment further includes populating 2D UI elements and/or 3D UI elements of the spatial computing environment based on camera, sensor, and/or other device inputs that capture images of the physical world or real-world equivalents of the UI elements. For instance, the device camera captures images of one or more physical objects. The images are processed to determine 2D planes or 3D outlines for the physical objects. The spatial computing environment presents the images of the one or more physical objects, and creates interactive 2D UI elements for the 2D planes of those objects or 3D UI elements for the 3D outlines of those objects.

A created interactive 2D UI element may include a transparent overlay that is positioned over the corresponding plane of the physical object. Interactions with that 2D UI element may include adding new colors, changing brightness, and/or changing other visual characteristics of the 2D plane to change the appearance of the physical object in the spatial computing environment without changing the physical characteristics of the physical object.

Process 700 includes determining (at 704) coordinates for each of the UI elements within the spatial computing environment. In some embodiments, the spatial computing environment tracks the positioning of each of the UI elements in the 3D space. For instance, the spatial computing environment may be associated with a positioning table or UI element manager that includes entries for the current positioning and/or coordinates of each UI element loaded into the spatial computing environment. In some other embodiments, the coordinates are extracted from the files or data structures that contain the UI element data.

Process 700 includes presenting (at 706) dynamic spatial pointer 100 with the first representation and the UI elements in the spatial computing environment. The first representation includes the first volumetric shape, such as a spherical pointer, for moving in three dimensions within the spatial computing environment and for selecting between the UI elements that are distributed across the spatial computing environment 3D space. Dynamic spatial pointer 100 is given the first representation when it is not attached to any UI element.

Process 700 includes tracking (at 708) the positioning of dynamic spatial pointer 100 relative to the determined coordinates of the UI elements. Tracking (at 708) the positioning of dynamic spatial pointer 100 includes receiving input from a controller, moving dynamic spatial pointer 100 in response to the input, and determining if dynamic spatial pointer 100 is positioned within a threshold distance of a UI element or touches part of that UI element.

Process 700 includes detecting (at 710) selection of a particular UI element based on the tracked (at 708) positioning and/or other user input. In some embodiments, the selection of the particular UI element occurs when dynamic spatial pointer 100 is the threshold distance from the particular UI element, touches or intersects part of the particular UI element, and/or the particular UI element is nearest to dynamic spatial pointer 100 when specific input for attaching dynamic spatial pointer 100 is given using the controller.

Process 700 includes determining (at 712) whether the particular UI element is a 3D UI element. The determination (at 712) is based on the determined (at 704) coordinates for the particular UI element. For instance, the spatial computing environment analyzes the determined (at 704) coordinates for the particular UI element to determine its dimensionality (e.g., defined across a single plane or spans multiple planes). To assist in the determination (at 712), each UI element in the spatial computing environment may be associated with an identifier that identifies whether that UI element is a 2D UI element or a 3D UI element, or one whether precise or imprecise interactions are needed for the particular UI elements.

In response to determining (at 712—Yes) that the particular UI element is a 3D UI element, process 700 includes attaching (at 714) dynamic spatial pointer 100 to the particular UI element with a second form or representation that is configured for movement, selection, and/or interaction with 3D UI elements, multiplanar objects, or multiplanar surfaces. In some embodiments, the second form or representation corresponds to the 3D teardrop pointer, a second volumetric shape that differs from the first volumetric shape, and/or a conical form with a larger distal end for identifying the pointer in the spatial computing environment and with a pointed proximal end where interactions with pixels, data points, or subelements of the 3D UI element are implemented.

In response to determining (at 712—No) that the particular UI element is not a 3D UI element, but rather a 2D UI element, process 700 includes attaching (at 716) dynamic spatial pointer 100 to the particular UI element with a third form or representation that is configured movement, selection, and/or interaction with 2D UI elements, single plane objects, or single plane surfaces. In some embodiments, the third form or representation corresponds to one of the flattened 2D pointer or the precise 2D selection pointer. Dynamic spatial pointer 100 may default to the flattened 2D pointer, and may subsequently change to the precise 2D selection pointer in response to input that activates the precise 2D selection pointer. Alternatively, dynamic spatial pointer 100 dynamically switches from the spherical pointer (e.g., the first representation) to the flattened 2D pointer when subelements and/or accessible functionality within the 2D UI element are not associated with precise movements or interactions, and to the precise 2D selection pointer when the subelements and/or accessible functionality within the 2D UI elements are associated with precise movements or interactions.

Process 700 includes mapping (at 718) controller inputs to retain dynamic spatial pointer 100 on the surface of the particular UI element. In some embodiments, mapping (at 718) the controller inputs includes ignoring one dimension of inputs provided by a 3D controller, or adjusting one dimension of the received inputs to retain dynamic spatial pointer 100 on the surface of a 2D UI element. In some embodiments, mapping (at 718) the controller inputs includes converting one dimension of the received inputs to two dimensions in order to track the shape of a 3D UI element, or adjusting one or more coordinates of the received inputs that deviate from coordinates of the determined (at 704) coordinates of the particular UI element (e.g., coordinates that penetrate or lift off the surface of the particular UI element) so that dynamic spatial pointer 100 remains on the surface of the 3D UI element.

In any case, mapping (at 718) the controller inputs includes adjusting the received inputs to match the determined (at 704) coordinates of the particular UI element so that inputs for moving dynamic spatial pointer 100 track the surface coordinates of the particular UI element, and so that dynamic spatial pointer 100 is not moved off, away, or through the surface of the particular UI element when the received inputs deviate by a threshold amount from the determined (at 704) coordinates of the particular UI element. Additionally, mapping (at 718) the controller inputs includes selecting subelements, pixels, or data points from the particular UI elements without the controller inputs being perfectly aligned with the coordinates of those subelements, pixels, or data points.

Process 700 includes performing (at 720) a precise selection or interaction with individual pixels or data points of the particular UI element by applying the mapped (at 718) controller inputs to the converted form or representation of the attached dynamic spatial pointer. For instance, the selection tip of the converted dynamic spatial pointer selects a desired set of pixels or data points from the surface of the particular UE according to inputs that may not directly align with or match the positioning (e.g., coordinates) of those pixels or data points in the spatial computing environment.

Performing (at 720) the precise selection or interaction includes applying an edit, operation, and/or other processing of the selected set of pixels or data points. For instance, the edits may include cutting and pasting the set of pixels, changing color and/or visual characteristics of the set of pixels, enlarging or shrinking the set of pixels, and/or performing other changes to the selected set of pixels. In some embodiments, the functionality of different tools may be invoked and/or applied to the selected set of pixels.

Process 700 includes detaching (at 722) dynamic spatial pointer 100 from the particular UI element in response to detaching input. The detaching input may include providing controller inputs that deviate from the determined (at 704) coordinates of the particular UI element by more than a threshold distance or amount, or may include specific input (e.g., a specific gesture, command, key combination, etc.) for detaching dynamic spatial pointer 100 from an attached UI element (e.g., the particular UI element). Detaching (at 722) dynamic spatial pointer 100 includes converting the form or representation of dynamic spatial pointer 100 back to the first representation or the spherical pointer defined for navigating within the spatial computing environment and for selecting between the UI element therein.

Figure 8:
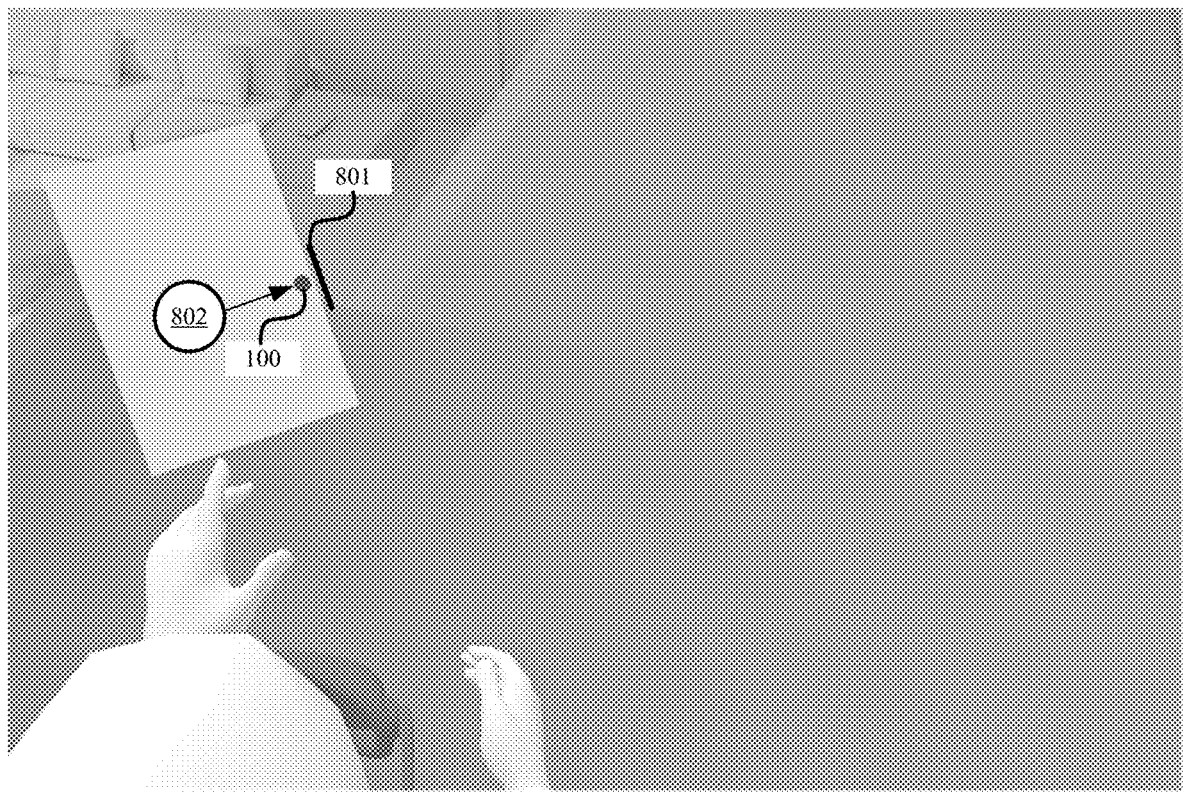
FIG. 8 illustrates a visual cue example for detaching the dynamic spatial pointer from an attached UI element in accordance with some embodiments presented herein.

In some embodiments, the spatial computing environment provides visual cues to assist with various UI element interactions. FIG. 8 illustrates a visual cue example for detaching dynamic spatial pointer 100 from an attached UI element in accordance with some embodiments presented herein.

The user provides input that moves (at 802) dynamic spatial pointer 100 to or past a boundary of the attached UI element. In response to detecting that the input reaches or moves past the boundary while remaining within a threshold distance of the boundary, visual cue 801 is provided at that boundary. Visual cue 801 provides a notification that dynamic spatial pointer 100 is set to detach from the UI element if moved further off or away from the boundary. In some embodiments, the color or visual representation of dynamic spatial pointer 100 is also changed to indicate when detachment is about to occur.

Other visual cues may be provided to indicate when dynamic spatial pointer 100 is coming in range of a UI element and is about to attach to that UI element, when dynamic spatial pointer 100 is about to change form or representation (e.g., from a precise pointer representation to an imprecise pointer representation), or when different functionality of dynamic spatial pointer 100 is being activated. For instance, dynamic spatial pointer 100 may have a particular form for precise selection within a 2D UI element. Dynamic spatial pointer 100 may be presented with a first color when the pointer is being moved without selecting any pixels or data points, and may be presented with a second color when activating the selection functionality and moving the pointer to select pixels or data points. Similarly, dynamic spatial pointer 100 may be presented as the flattened 2D pointer when a paint brush editing tool is selected and dynamic spatial pointer 100 is attached to a 2D UI element. The color of the flattened 2D pointer changes in response to the painting function being activated and deactivated.

Figure 9:
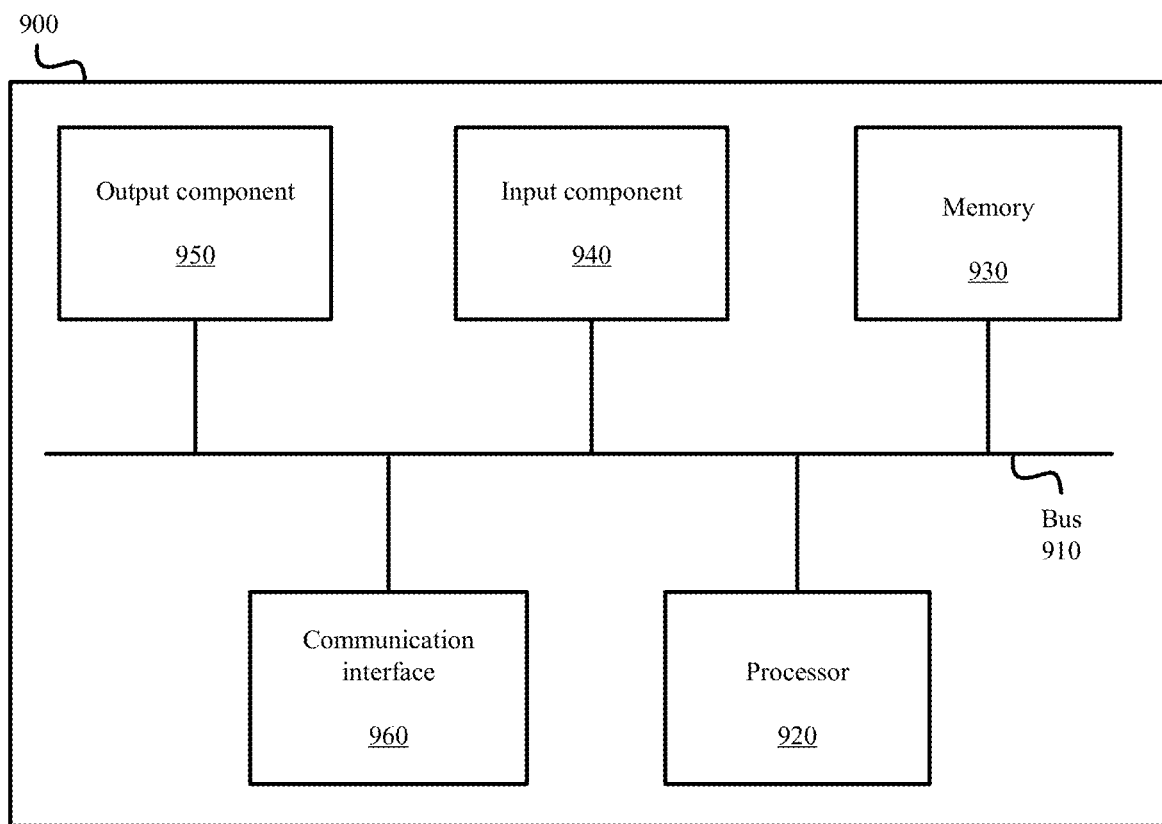
FIG. 9 illustrates example components of one or more devices, according to one or more embodiments described herein.

FIG. 9 is a diagram of example components of device 900. Device 900 may be used to implement one or more of the devices or systems described above (e.g., dynamic spatial pointer 100, the spatial computing environment, the spatial computing device, the spatial computing controller, etc.). Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more LEDs, etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
presenting a plurality of two-dimensional ("2D") user interface ("UI") elements and three-dimensional ("3D") UI elements that are distributed within a 3D interactive space;
providing a dynamic spatial pointer with a first 3D representation for navigating the 3D interactive space and selecting a UI element from the plurality of 2D UI elements and 3D UI elements, wherein providing the dynamic spatial pointer with the first 3D representation comprises presenting a first volumetric shape that spans a non-flat volume of the 3D interactive space and that has a selectable region corresponding to the non-flat volume of the first volumetric shape;
converting the dynamic spatial pointer from the first 3D representation to a different second 3D representation in response to the dynamic spatial pointer attaching to a particular 3D UI element of the plurality of 2D UI elements and 3D UI elements, wherein converting the dynamic spatial pointer to the different second 3D representation comprises changing from the first volumetric shape to a second volumetric shape with a selection tip that reduces the selectable region from the non-flat volume of the first volumetric shape to a smaller region of the selection tip; and
converting the dynamic spatial pointer from the first 3D representation to a first 2D representation in response to the dynamic spatial pointer attaching to a particular 2D UI element of the plurality of 2D UI elements and 3D UI elements, wherein converting the dynamic spatial pointer to the first 2D representation comprises flattening the first volumetric shape to a flattened 2D shape that is presented over the particular 2D UI element.

2. The method of claim 1 further comprising:
attaching the dynamic spatial pointer to the particular 3D UI element in response to user input that initiates an attachment of the dynamic spatial pointer to the particular 3D UI element;
adjusting coordinates of the user input that deviate from coordinates about a surface of the particular 3D UI element to match the coordinates about the surface of the particular 3D UI element; and
moving the dynamic spatial pointer across the surface of the particular 3D UI element with the second 3D representation attached to the surface of the particular 3D UI element in response to adjusting the coordinates.

3. The method of claim 2, wherein adjusting the coordinates comprises:
determining x, y, and z coordinates for points about the surface of the particular 3D UI element;
determining that one or more x, y, and z coordinates provided as the user input deviate, by less than a threshold amount, from the x, y, and z coordinates for points about the surface of the particular 3D UI element that are adjacent to the dynamic spatial pointer; and
adjusting the one or more x, y, and z coordinates provided as the user input based on the x, y, and z coordinates for the points about the surface of the particular 3D UI element that are adjacent to the dynamic spatial pointer.

4. The method of claim 2, wherein adjusting the coordinates comprises:
determining 3D coordinates for points about the surface of the particular 3D UI element;
receiving 2D coordinates as the user input; and
retaining the dynamic spatial pointer on the surface of the particular 3D UI element by mapping the 2D coordinates to the 3D coordinates for points defined with the 2D coordinates of the user input.

5. The method of claim 1,
wherein the first 3D representation comprises a spherical form that spans a plurality of pixels or data points of the 3D interactive space, and
wherein the second 3D representation comprises a 3D teardrop form with selection tip at a distal end of the 3D teardrop that selects individual pixels or data points of the 3D UI elements.

6. The method of claim 1 further comprising:
attaching the dynamic spatial pointer to the particular 2D UI element in response to user input that initiates an attachment of the dynamic spatial pointer to the particular 2D UI element;
converting 3D coordinates of the user input to match 2D coordinates that define a 2D plane of the particular 2D UI element; and
moving the first 2D representation of the dynamic spatial pointer over the 2D plane of the particular 2D UI element in response to converting the 3D coordinates.

7. The method of claim 6, wherein converting the 3D coordinates comprises:
changing a particular dimensional coordinate of the 3D coordinates to match a value that is defined for the particular dimensional coordinate across the 2D plane of the particular 2D UI element.

8. The method of claim 1, wherein converting the dynamic spatial pointer to the first 2D representation comprises:
analyzing one or more subelements or functionality of the particular 2D UI element; and
selecting between an imprecise 2D pointer and a precise 2D pointer for the first 2D representation based on the subelements or the functionality of the particular 2D UI element.

9. The method of claim 1, wherein converting the dynamic spatial pointer to the first 2D representation comprises:
selecting a flattened 2D pointer as the first 2D representation in response to the particular 2D UI element comprising a first set of subelements or functionality that do not involve precise selection; and
selecting a 2D pointer with a selection tip as the first 2D representation in response to the particular 2D UI element comprising a second set of subelements or functionality that involve precise selection.

10. The method of claim 1 further comprising:
converting the dynamic spatial pointer from the first 2D representation to a different second 2D representation in response to user input or activation of a selection tool, wherein the first 2D representation comprises a flattened 2D pointer without a selection tip and the second 3D representation comprises a flattened 2D pointer with the selection tip.

11. The method of claim 1 further comprising:
attaching the dynamic spatial pointer to a 3D form of the particular 3D UI element;
retaining the dynamic spatial pointer connected to the 3D form of the particular 3D UI element in response to user input moving the dynamic spatial pointer across the 3D form;
detaching the dynamic spatial pointer from the particular 3D UI element;
attaching the dynamic spatial pointer to a 2D plane of the particular 2D UI element; and
retaining the dynamic spatial pointer connected to the 2D plane of the particular 2D UI element in response to user input moving the dynamic spatial pointer across the 2D plane.

12. The method of claim 11, wherein detaching the dynamic spatial pointer comprises:
converting the dynamic spatial pointer from the second 3D representation to the first 3D representation; and moving the dynamic spatial pointer with the first 3D representation in the 3D interactive space from the particular 3D UI element to the particular 2D UI element.

13. The method of claim 1 further comprising:
tracking a positioning of the dynamic spatial pointer in the 3D interactive space relative to coordinates of each UI element of the plurality of 2D UI elements and 3D UI elements; and
attaching the dynamic spatial pointer to the particular 3D UI element in response to the positioning of the dynamic spatial pointer coming within a threshold distance of the coordinates of the particular 3D UI element or intersecting one or more of the coordinates of the particular 3D UI element.

14. The method of claim 1 further comprising:
detecting a 3D form of the particular 3D UI element;
selecting the second 3D representation for the dynamic spatial pointer from a plurality of different pointer forms in response to the detecting the 3D form of the particular 3D UI element and attaching the dynamic spatial pointer to the particular 3D UI element;
detecting a 2D form of the particular 2D UI element; and
selecting the first 2D representation for the dynamic spatial pointer from the plurality of different pointer forms in response to the detecting the 2D form of the particular 2D UI element and attaching the dynamic spatial pointer to the particular 2D UI element.

15. A spatial computing system comprising:
one or more hardware processors configured to:
present a plurality of two-dimensional ("2D") user interface ("UI") elements and three-dimensional ("3D") UI elements that are distributed within a 3D interactive space;
provide a dynamic spatial pointer with a first 3D representation for navigating the 3D interactive space and selecting a UI element from the plurality of 2D UI elements and 3D UI elements, wherein providing the dynamic spatial pointer with the first 3D representation comprises presenting a first volumetric shape that spans a non-flat volume of the 3D interactive space and that has a selectable region corresponding to the non-flat volume of the first volumetric shape;
convert the dynamic spatial pointer from the first 3D representation to a different second 3D representation in response to the dynamic spatial pointer attaching to a particular 3D UI element of the plurality of 2D UI elements and 3D UI elements, wherein converting the dynamic spatial pointer to the different second 3D representation comprises changing from the first volumetric shape to a second volumetric shape with a selection tip that reduces the selectable region from the non-flat volume of the first volumetric shape to a smaller region of the selection tip; and
convert the dynamic spatial pointer from the first 3D representation to a first 2D representation in response to the dynamic spatial pointer attaching to a particular 2D UI element of the plurality of 2D UI elements and 3D UI elements, wherein converting the dynamic spatial pointer to the first 2D representation comprises flattening the first volumetric shape to a flattened 2D shape that is presented over the particular 2D UI element.

16. The spatial computing system of claim 15, wherein the one or more hardware processors are further configured to:
attach the dynamic spatial pointer to the particular 3D UI element in response to user input that initiates an attachment of the dynamic spatial pointer to the particular 3D UI element;
adjust coordinates of the user input that deviate from coordinates about a surface of the particular 3D UI element to match the coordinates about the surface of the particular 3D UI element; and
move the dynamic spatial pointer across the surface of the particular 3D UI element with the second 3D representation attached to the surface of the particular 3D UI element in response to adjusting the coordinates.

17. The spatial computing system of claim 16, wherein adjusting the coordinates comprises:
determining x, y, and z coordinates for points about the surface of the particular 3D UI element;
determining that one or more x, y, and z coordinates provided as the user input deviate, by less than a threshold amount, from the x, y, and z coordinates for points about the surface of the particular 3D UI element that are adjacent to the dynamic spatial pointer; and
adjusting the one or more x, y, and z coordinates provided as the user input based on the x, y, and z coordinates for the points about the surface of the particular 3D UI element that are adjacent to the dynamic spatial pointer.

18. The spatial computing system of claim 16, wherein adjusting the coordinates comprises:
determining 3D coordinates for points about the surface of the particular 3D UI element;
receiving 2D coordinates as the user input; and
retaining the dynamic spatial pointer on the surface of the particular 3D UI element by mapping the 2D coordinates to the 3D coordinates for points defined with the 2D coordinates of the user input.

19. The spatial computing system of claim 15, wherein the one or more hardware processors are further configured to:
attach the dynamic spatial pointer to the particular 2D UI element in response to user input that initiates an attachment of the dynamic spatial pointer to the particular 2D UI element;
convert 3D coordinates of the user input to match 2D coordinates that define a 2D plane of the particular 2D UI element; and
move the first 2D representation of the dynamic spatial pointer over the 2D plane of the particular 2D UI element in response to converting the 3D coordinates.

20. A non-transitory computer-readable medium storing program instructions that, when executed by one or more hardware processors of a spatial computing system, cause the spatial computing system to perform operations comprising:
presenting a plurality of two-dimensional ("2D") user interface ("UI") elements and three-dimensional ("3D") UI elements that are distributed within a 3D interactive space;
providing a dynamic spatial pointer with a first 3D representation for navigating the 3D interactive space and selecting a UI element from the plurality of 2D UI elements and 3D UI elements, wherein providing the dynamic spatial pointer with the first 3D representation comprises presenting a first volumetric shape that spans a non-flat volume of the 3D interactive space and that has a selectable region corresponding to the non-flat volume of the first volumetric shape;
converting the dynamic spatial pointer from the first 3D representation to a different second 3D representation in response to the dynamic spatial pointer attaching to a particular 3D UI element of the plurality of 2D UI elements and 3D UI elements, wherein converting the dynamic spatial pointer to the different second 3D representation comprises changing from the first volumetric shape to a second volumetric shape with a selection tip that reduces the selectable region from the non-flat volume of the first volumetric shape to a smaller region of the selection tip; and converting the dynamic spatial pointer from the first 3D representation to a first 2D representation in response to the dynamic spatial pointer attaching to a particular 2D UI element of the plurality of 2D UI elements and 3D UI elements, wherein converting the dynamic spatial pointer to the first 2D representation comprises flattening the first volumetric shape to a flattened 2D shape that is presented over the particular 2D UI element.

* * * * *